United States Patent
Liao et al.

(10) Patent No.: US 11,270,425 B2
(45) Date of Patent: Mar. 8, 2022

(54) COORDINATE ESTIMATION ON N-SPHERES WITH SPHERICAL REGRESSION

(71) Applicant: QUALCOMM Technologies, Inc., San Diego, CA (US)

(72) Inventors: Shuai Liao, Amsterdam (NL); Efstratios Gavves, Amsterdam (NL); Cornelis Snoek, Volendam (NL)

(73) Assignee: Qualcomm Technologies, Inc., San Diego, CA (US)

( * ) Notice: Subject to any disclaimer, the term of this patent is extended or adjusted under 35 U.S.C. 154(b) by 284 days.

(21) Appl. No.: 16/686,007

(22) Filed: Nov. 15, 2019

(65) Prior Publication Data

US 2020/0160501 A1 May 21, 2020

(30) Foreign Application Priority Data

Nov. 15, 2018 (GR) .............................. 20180100520

(51) Int. Cl.
| | | |
|---|---|---|
| *G06T 7/00* | (2017.01) | |
| *G06N 20/10* | (2019.01) | |
| *G06N 3/08* | (2006.01) | |
| *G06N 3/04* | (2006.01) | |

(52) U.S. Cl.
CPC ......... *G06T 7/0002* (2013.01); *G06N 3/0481* (2013.01); *G06N 3/08* (2013.01); *G06N 20/10* (2019.01)

(58) Field of Classification Search
CPC .......... G06T 7/0002; G06T 7/62; G06T 7/70; G06T 7/73; G06T 2207/20081; G06T 2207/10084; G06T 2207/20084; G06T 2207/10024; G06N 20/00; G06N 20/10; G06N 3/08; G06N 3/082; G06N 3/04; G06N 3/0481; G06N 3/0472; G06N 3/0454; G06N 3/084; G06N 3/049; G06K 9/6285; G06K 9/00201; G06K 9/4628; G06K 9/00255; G06K 9/00281; G06K 9/3241
See application file for complete search history.

(56) References Cited

U.S. PATENT DOCUMENTS

| | | | | |
|---|---|---|---|---|
| 10,275,719 | B2* | 4/2019 | Talathi | G06N 20/00 |
| 10,339,409 | B2* | 7/2019 | Wang | G06K 9/42 |
| 10,896,342 | B2* | 1/2021 | Gavrilyuk | G06T 7/215 |
| 2015/0074130 | A1* | 3/2015 | Kimmel | G06F 16/284 |
| | | | | 707/756 |

(Continued)

OTHER PUBLICATIONS

"Spherical Regression: Learning Viewpoints, Surface Normals and 3D Rotations on n-Spheres"; Shuai Liao, 2019 IEEE/CVF Conference on Computer Vision and Pattern Recognition (CVPR) (Year: 2019).*

(Continued)

*Primary Examiner* — Michael S Osinski
(74) *Attorney, Agent, or Firm* — Holland & Hart LLP

(57) ABSTRACT

A method for labeling a spherical target includes receiving an input including a representation of an object. The method also includes estimating unconstrained coordinates corresponding to the object. The method further includes estimating coordinates on a sphere by applying a spherical exponential activation function to the unconstrained coordinates. The method also associates the input with a set of values corresponding to a spherical target based on the estimated coordinates on the sphere.

20 Claims, 9 Drawing Sheets

(56) References Cited

U.S. PATENT DOCUMENTS

| | | | | |
|---|---|---|---|---|
| 2016/0078590 | A1* | 3/2016 | Aoki | G06T 3/00 |
| | | | | 382/275 |
| 2016/0188992 | A1* | 6/2016 | Hiraga | G06K 9/4604 |
| | | | | 382/199 |
| 2017/0302714 | A1* | 10/2017 | Ramsay | H04L 65/601 |
| 2018/0025467 | A1* | 1/2018 | Macmillan | G06T 15/20 |
| | | | | 382/190 |
| 2018/0121791 | A1* | 5/2018 | O'Connor | G06N 3/049 |
| 2018/0144493 | A1* | 5/2018 | Mulukutla | G06T 17/20 |
| 2019/0114747 | A1* | 4/2019 | Treibitz | G06K 9/6215 |
| 2019/0125215 | A1* | 5/2019 | Swanson | A61B 5/4561 |
| 2019/0138029 | A1* | 5/2019 | Ryll | G05D 1/0055 |
| 2019/0310759 | A1* | 10/2019 | Stein | G06F 3/04815 |
| 2019/0332941 | A1* | 10/2019 | Towal | G06N 3/084 |
| 2020/0111250 | A1* | 4/2020 | Huang | G06T 15/04 |
| 2020/0302185 | A1* | 9/2020 | Hussein | G06N 3/084 |
| 2020/0302232 | A1* | 9/2020 | Kilickaya | G06K 9/346 |
| 2020/0389601 | A1* | 12/2020 | Boyless | G06T 19/006 |
| 2021/0073938 | A1* | 3/2021 | Yu | G06T 9/001 |
| 2021/0089923 | A1* | 3/2021 | Kicanaoglu | G06F 17/153 |

OTHER PUBLICATIONS

International Search Report and Written Opinion—PCT/US2019/061878—ISA/EPO—dated Feb. 13, 2020.

Mahendran S., et al., "A Mixed Classification-Regression Framework for 3D Pose Estimation from 2D Images", arxiv.org, Cornell University Library, 201 Olin Library Cornell University Ithaca, NY, 14853, May 8, 2018 (May 8, 2018), pp. 1-16, XP080876170, sections 1-4; figures 1-4.

Rosenthal M., et al., "Spherical Regression Models Using Projective Linear Transformations", Journal of the American Statistical Association, vol. 109, No. 508, Oct. 2, 2014 (Oct. 2, 2014), pp. 1615-1624, XP055665878, US, ISSN: 0162-1459, DOI: 10.1080/01621459.2014.892881, sections 1-4, abstract; figures 1-4.

Shi X., et al., "Spherical Regression under Mismatch Corruption with Application to Automated Knowledge Translation", arxiv.org, Cornell University Library, 201 Olin Library Cornell University Ithaca, NY, 14853, Oct. 12, 2018 (Oct. 12, 2018), pp. 1-60, XP081491845, sections 1.1-4.

Divon G., et al., "Viewpoint Estimation—Insights & Model", ECCV 2018, pp. 1-17.

Kendall A., et al., "PoseNet: A Convolutional Network for Real-Time 6-DOF Camera Relocalization", 2015 IEEE International Conference on Computer Vision, pp. 2938-2946.

Massa F., et al., "Crafting a Multi-task CNN for Viewpoint Estimation", BMVC, 2016, pp. 1-12.

Osadchy M., et al., "Synergistic Face Detection and Pose Estimation with Energy-Based Models", Journal of Machine Learning Research, vol. 8, 2007, pp. 1197-1215.

Penedones H., et al., "Improving Object Classification Using Pose Information", Idiap Research Report 2012, 14 pages.

Poirson P., et al., "Fast Single Shot Detection and Pose Estimation", 3DV, 2016, pp. 4321-4329.

Su H., et al., "Render for CNN: Viewpoint Estimation in Images Using CNNs Trained with Rendered 3D Model Views", ICCV, 2015, pp. 2686-2694.

Tulsiani S., et aL, "Viewpoints and Keypoints", CVPR, 2015, pp. 1510-1519.

Xiang Y., et al., "Beyond PASCAL: A Benchmark for 3D Object Detection in the Wild", WACV 2014, 8 pages.

* cited by examiner $$\cos^2\varphi + \sin^2\varphi = 1$$

COORDINATE ESTIMATION ON N-SPHERES WITH SPHERICAL REGRESSION

CROSS REFERENCE TO RELATED APPLICATION

This application claims the benefit under 35 U.S.C. § 119(a) to Greek Patent Application No. 20180100520, entitled "COORDINATE ESTIMATION ON N-SPHERES WITH SPHERICAL REGRESSION," filed on Nov. 15, 2018, the disclosure of which is expressly incorporated herein by reference in its entirety.

BACKGROUND

Field

Aspects of the present disclosure generally relate to spherical coordinate estimation.

Background

An artificial neural network, which may comprise an interconnected group of artificial neurons (e.g., neuron models), is a computational device, or represents a method to be performed by a computational device. The artificial neural network may be used for various applications and/or devices, such as Internet Protocol (IP) cameras, Internet of Things (IoT) devices, autonomous vehicles, and/or service robots.

An artificial neural network may be used for estimating coordinates on an n-dimension sphere. In some cases, coordinate estimation may be used to determine viewing angles of a camera that captured an image of an object or surface normal of objects in an image. Conventional coordinate estimation systems use a classification-based system, a regression-based system, or a hybrid-based system. It is desirable to improve coordinate estimation to return continous angles while reducing a complexity of a loss function.

SUMMARY

In one aspect of the present disclosure, a method includes receiving an input including a representation of an object. The method also includes estimating unconstrained coordinates corresponding to the object. The method further includes estimating coordinates to a sphere by applying a spherical exponential activation function on the unconstrained coordinates. The method still further includes associating the input with a set of values corresponding to a spherical target based on the estimated coordinates on the sphere.

Another aspect of the present disclosure is directed to an apparatus including means for receiving an input including a representation of an object. The apparatus also includes means for estimating unconstrained coordinates corresponding to the object. The apparatus further includes means for estimating coordinates to a sphere by applying a spherical exponential activation function on the unconstrained coordinates. The apparatus still further includes means for associating the input with a set of values corresponding to a spherical target based on the estimated coordinates on the sphere.

In another aspect of the present disclosure, a non-transitory computer-readable medium with non-transitory program code recorded thereon is disclosed. The program code is executed by a processor and includes program code to receive an input including a representation of an object. The program code also includes program code to estimate unconstrained coordinates corresponding to the object. The program code further includes program code to estimate coordinates to a sphere by applying a spherical exponential activation function on the unconstrained coordinates. The program code still further includes program code to associate the input with a set of values corresponding to a spherical target based on the estimated coordinates on the sphere.

Another aspect of the present disclosure is directed to an apparatus having a memory and one or more processors coupled to the memory. The processor(s) is configured to receive an input including a representation of an object. The processor(s) is also configured to estimate unconstrained coordinates corresponding to the object. The processor(s) is further configured to estimate coordinates to a sphere by applying a spherical exponential activation function on the unconstrained coordinates. The processor(s) is still further configured to associate the input with a set of values corresponding to a spherical target based on the estimated coordinates on the sphere.

Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1:
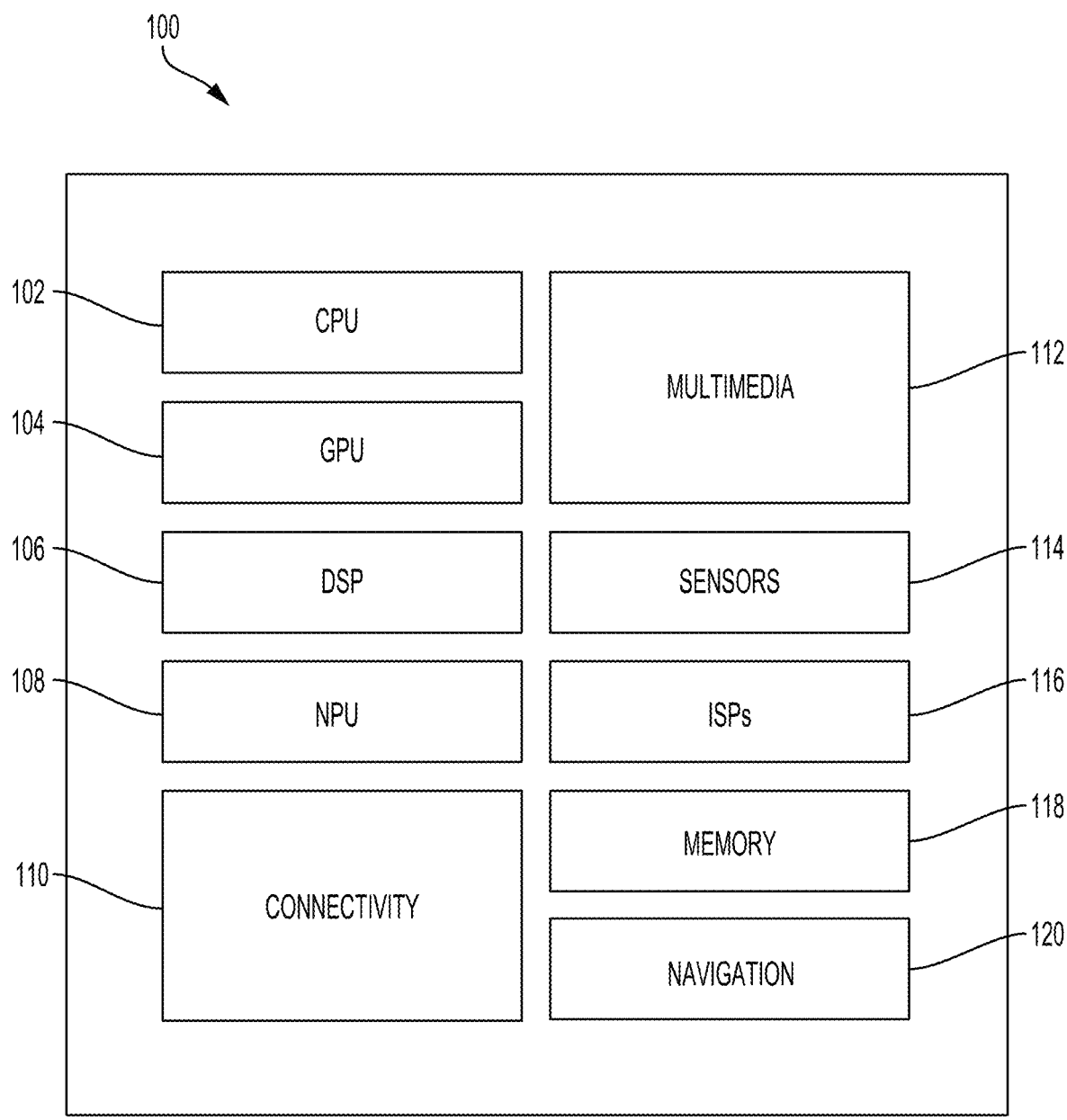
FIG. 1 illustrates an example implementation of designing a neural network using a system-on-a-chip (SOC), including a general-purpose processor in accordance with certain aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method practiced using other structure, functionality, or structure and functionality in addition to or other than the various aspects of the disclosure set forth. It should be understood that any aspect of the disclosure disclosed may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein many variations and permutations of these aspects fall within the scope of the disclosure. Although some benefits and advantages of the preferred aspects are mentioned, the scope of the disclosure is not intended to be limited to particular benefits, uses or objectives. Rather, aspects of the disclosure are intended to be broadly applicable to different technologies, system configurations, networks and protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

An artificial neural network may estimate coordinates on an n-dimensional sphere. In some cases, coordinate estimation may determine viewing angles of a camera that captured an image of an object. Additionally, coordinate estimation may determine surface normals of an object in an image. Conventional coordinate estimation systems use a classification system, a regression system, or a hybrid system.

A classification system discretizes a continuous output space of angles into multiple bins. For example, some classification-based systems discretize the angle range $[-\pi, \pi]$ into 360 bins. To improve the granularity of angle predictions, some conventional systems use two sets of bins (e.g., coarse-discretized and fine-discretized bins). Fine discretization may increase intra-class confusion. Some conventional classification systems use a loss that accounts for a correlation between neighboring bins. To train the classification system, synthetic renderings provide a large amount of training examples.

Classification systems may have some advantages over conventional regression systems. For example, provided that coarse viewpoints suffice, a cross-entropy objective may improve training. As another example, a softmax classifier provides some degree of uncertainty estimation, which may be relevant for symmetric objects. Still, in most cases, classification systems may not provide continuous, or fine-grained, angle predictions. Additionally, discretization may be limited to low-dimensional output spaces (e.g., $S^1$ spheres).

Because of the periodical nature of angles, regression systems generally do not regress directly on the linear space of angles, azimuth, elevation, theta $\in [-\pi, \pi]$. Specifically, ignoring angle periodicity leads to bad modeling, as the 1° and 359° angles are assumed to be the furthest apart. Instead, most regression systems use trigonometric representations, where some regression systems represent angles φ with [cos φ, sin φ]. In comparison to classification systems, regression systems provide continuous and fine-grained angles. In practice, however, complex loss functions, such as smooth $l_1$ loss, are used to train a regression system for viewpoint estimation. Due to the complexity (e.g., increased use of computational resources), most systems do not implement a regression system.

Classification and regression systems for viewpoint estimation are complementary. Therefore, coordinate estimation may use a hybrid classification and regression system. Some hybrid systems discretize orientation angles into n overlapping bins, and refine the remaining angle residual by regression. Other hybrid systems assume a mixture model of von-Mises distributions to model the posterior distribution of orientation angles. Furthermore, other hybrid systems propose k-means clustering for angle discretization when generalization to other datasets is not relevant.

It is desirable to improve coordinate estimation to return continuous angles while reducing a complexity of a loss function. Aspects of the present disclosure are directed to a spherical regression system. Compared to conventional regression systems, the spherical regression system improves training and accuracy. Additionally, in comparison to classification systems, the spherical regression system improves accuracy while producing continuous and fine-grained estimates.

FIG. 1 illustrates an example implementation of a system-on-a-chip (SOC) 100, which may include a central processing unit (CPU) 102 or a multi-core CPU configured for coordinate estimation via a spherical regression-based neural network in accordance with certain aspects of the present disclosure. Variables (e.g., neural signals and synaptic weights), system parameters associated with a computational device (e.g., neural network with weights), delays, frequency bin information, and task information may be stored in a memory block associated with a neural processing unit (NPU) 108, in a memory block associated with a CPU 102, in a memory block associated with a graphics processing unit (GPU) 104, in a memory block associated with a digital signal processor (DSP) 106, in a memory block 118, or may be distributed across multiple blocks. Instructions executed at the CPU 102 may be loaded from a program memory associated with the CPU 102 or may be loaded from a memory block 118.

The SOC 100 may also include additional processing blocks tailored to specific functions, such as a GPU 104, a DSP 106, a connectivity block 110, which may include fifth generation (5G) connectivity, fourth generation long term evolution (4G LTE) connectivity, Wi-Fi connectivity, USB connectivity, Bluetooth connectivity, and the like, and a multimedia processor 112 that may, for example, detect and recognize gestures. In one implementation, the NPU is implemented in the CPU, DSP, and/or GPU. The SOC 100 may also include a sensor processor 114, image signal processors (ISPs) 116, and/or navigation module 120, which may include a global positioning system.

The SOC 100 may be based on an ARM instruction set. In an aspect of the present disclosure, the instructions loaded into the general-purpose processor 102 may comprise code to receive an image comprising an object. The general-purpose processor 102 may also comprise code to estimate unconstrained coordinates corresponding to the object. The general-purpose processor 102 may further comprise code to estimate coordinates on a sphere by applying a spherical exponential activation function on the unconstrained coordinates. The general-purpose processor 102 may still further comprise code to associate the input with a set of values corresponding to a spherical target based on the estimated coordinates on the sphere.

Deep learning architectures may perform an object recognition task by learning to represent inputs at successively higher levels of abstraction in each layer, thereby building up a useful feature representation of the input data. In this way, deep learning addresses a major bottleneck of traditional machine learning. Prior to the advent of deep learning, a machine learning approach to an object recognition problem may have relied heavily on human-engineered features, perhaps in combination with a shallow classifier. A shallow classifier may be a two-class linear classifier, for example, in which a weighted sum of the feature vector components may be compared with a threshold to predict to which class the input belongs. Human-engineered features may be templates or kernels tailored to a specific problem domain by engineers with domain expertise. Deep learning architectures, in contrast, may learn to represent features that are similar to what a human engineer might design, but through training. Furthermore, a deep network may learn to represent and recognize new types of features that a human might not have considered.

A deep learning architecture may learn a hierarchy of features. If presented with visual data, for example, the first layer may learn to recognize relatively simple features, such as edges, in the input stream. In another example, if presented with auditory data, the first layer may learn to recognize spectral power in specific frequencies. The second layer, taking the output of the first layer as input, may learn to recognize combinations of features, such as simple shapes for visual data or combinations of sounds for auditory data. For instance, higher layers may learn to represent complex shapes in visual data or words in auditory data. Still higher layers may learn to recognize common visual objects or spoken phrases.

Deep learning architectures may perform especially well when applied to problems that have a natural hierarchical structure. For example, the classification of motorized vehicles may benefit from first learning to recognize wheels, windshields, and other features. These features may be combined at higher layers in different ways to recognize cars, trucks, and airplanes.

Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network, as described above. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input.

Figure 2A:
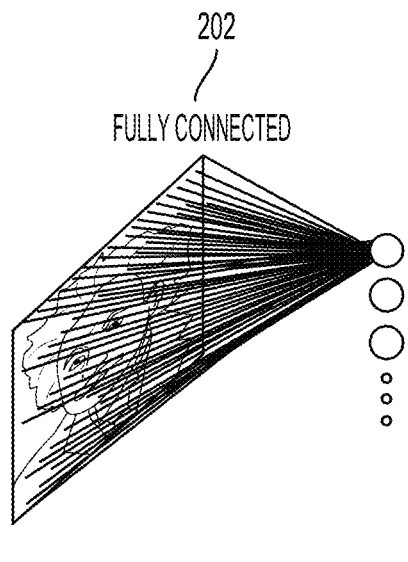
FIGS. 2A, 2B, and 2C are diagrams illustrating a neural network in accordance with aspects of the present disclosure.
Figure 2B:
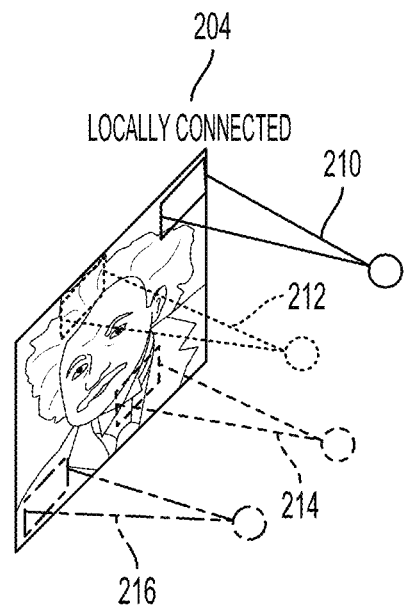

The connections between layers of a neural network may be fully connected or locally connected. FIG. 2A illustrates an example of a fully connected neural network 202. In a fully connected neural network 202, a neuron in a first layer may communicate its output to every neuron in a second layer, so that each neuron in the second layer will receive input from every neuron in the first layer. FIG. 2B illustrates an example of a locally connected neural network 204. In a locally connected neural network 204, a neuron in a first layer may be connected to a limited number of neurons in the second layer. More generally, a locally connected layer of the locally connected neural network 204 may be configured so that each neuron in a layer will have the same or a similar connectivity pattern, but with connections strengths that may have different values (e.g., 210, 212, 214, and 216). The locally connected connectivity pattern may give rise to spatially distinct receptive fields in a higher layer, because the higher layer neurons in a given region may receive inputs that are tuned through training to the properties of a restricted portion of the total input to the network.

Figure 2C:
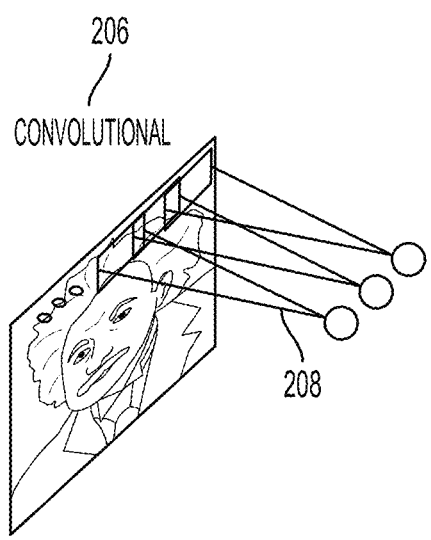

One example of a locally connected neural network is a convolutional neural network. FIG. 2C illustrates an example of a convolutional neural network 206. The convolutional neural network 206 may be configured such that the connection strengths associated with the inputs for each neuron in the second layer are shared (e.g., 208). Convolutional neural networks may be well suited to problems in which the spatial location of inputs is meaningful.

Figure 2D:
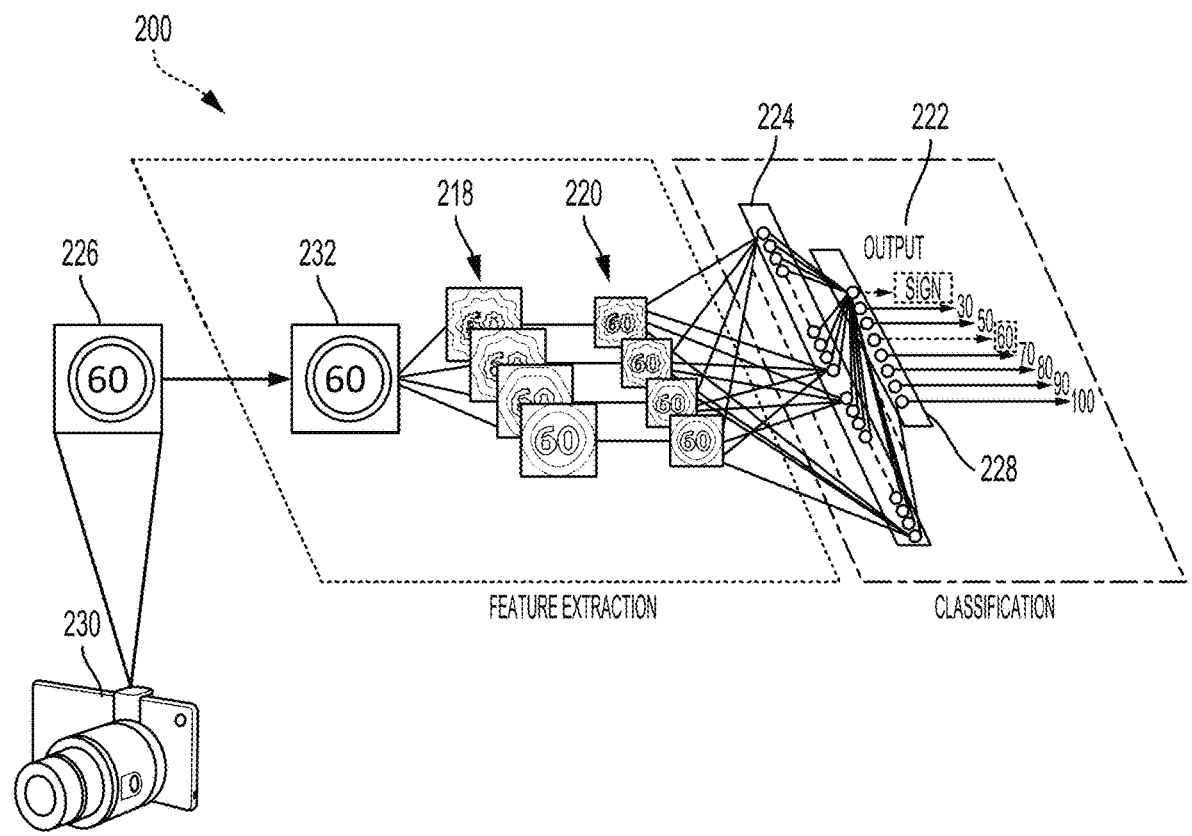
FIG. 2D is a diagram illustrating an exemplary deep convolutional network (DCN) in accordance with aspects of the present disclosure.

One type of convolutional neural network is a deep convolutional network (DCN). FIG. 2D illustrates a detailed example of a DCN 200 designed to recognize visual features from an image 226 input from an image capturing device 230, such as a car-mounted camera. The DCN 200 of the current example may be trained to identify traffic signs and a number provided on the traffic sign. Of course, the DCN 200 may be trained for other tasks, such as identifying lane markings or identifying traffic lights.

The DCN 200 may be trained with supervised learning. During training, the DCN 200 may be presented with an image, such as the image 226 of a speed limit sign, and a forward pass may then be computed to produce an output 222. The DCN 200 may include a feature extraction section and a classification section. Upon receiving the image 226, a convolutional layer 232 may apply convolutional kernels (not shown) to the image 226 to generate a first set of feature maps 218. As an example, the convolutional kernel for the convolutional layer 232 may be a 5×5 kernel that generates 28×28 feature maps. In the present example, because four different feature maps are generated in the first set of feature maps 218, four different convolutional kernels were applied to the image 226 at the convolutional layer 232. The convolutional kernels may also be referred to as filters or convolutional filters.

The first set of feature maps 218 may be subsampled by a max pooling layer (not shown) to generate a second set of feature maps 220. The max pooling layer reduces the size of the first set of feature maps 218. That is, a size of the second set of feature maps 220, such as 14×14, is less than the size of the first set of feature maps 218, such as 28×28. The reduced size provides similar information to a subsequent layer while reducing memory consumption. The second set of feature maps 220 may be further convolved via one or more subsequent convolutional layers (not shown) to generate one or more subsequent sets of feature maps (not shown).

In the example of FIG. 2D, the second set of feature maps 220 is convolved to generate a first feature vector 224. Furthermore, the first feature vector 224 is further convolved to generate a second feature vector 228. Each feature of the second feature vector 228 may include a number that corresponds to a possible feature of the image 226, such as "sign," "60," and "100." A softmax function (not shown) may convert the numbers in the second feature vector 228 to a probability. As such, an output 222 of the DCN 200 is a probability of the image 226 including one or more features.

In the present example, the probabilities in the output 222 for "sign" and "60" are higher than the probabilities of the others of the output 222, such as "30," "40," "50," "70," "80," "90," and "100". Before training, the output 222 produced by the DCN 200 is likely to be incorrect. Thus, an error may be calculated between the output 222 and a target output. The target output is the ground truth of the image 226 (e.g., "sign" and "60"). The weights of the DCN 200 may then be adjusted so the output 222 of the DCN 200 is more closely aligned with the target output.

To adjust the weights, a learning algorithm may compute a gradient vector for the weights. The gradient may indicate an amount that an error would increase or decrease if the weight were adjusted. At the top layer, the gradient may correspond directly to the value of a weight connecting an activated neuron in the penultimate layer and a neuron in the output layer. In lower layers, the gradient may depend on the value of the weights and on the computed error gradients of the higher layers. The weights may then be adjusted to reduce the error. This manner of adjusting the weights may be referred to as "back propagation" as it involves a "backward pass" through the neural network.

In practice, the error gradient of weights may be calculated over a small number of examples, so that the calculated gradient approximates the true error gradient. This approximation method may be referred to as stochastic gradient descent. Stochastic gradient descent may be repeated until the achievable error rate of the entire system has stopped decreasing or until the error rate has reached a target level. After learning, the DCN may be presented with new images (e.g., the speed limit sign of the image 226) and a forward pass through the network may yield an output 222 that may be considered an inference or a prediction of the DCN.

Deep belief networks (DBNs) are probabilistic models comprising multiple layers of hidden nodes. DBNs may be used to extract a hierarchical representation of training data sets. A DBN may be obtained by stacking up layers of Restricted Boltzmann Machines (RBMs). An RBM is a type of artificial neural network that can learn a probability distribution over a set of inputs. Because RBMs can learn a probability distribution in the absence of information about the class to which each input should be categorized, RBMs are often used in unsupervised learning. Using a hybrid unsupervised and supervised paradigm, the bottom RBMs of a DBN may be trained in an unsupervised manner and may serve as feature extractors, and the top RBM may be trained in a supervised manner (on a joint distribution of inputs from the previous layer and target classes) and may serve as a classifier.

Deep convolutional networks (DCNs) are networks of convolutional networks, configured with additional pooling and normalization layers. DCNs have achieved state-of-the-art performance on many tasks. DCNs can be trained using supervised learning in which both the input and output targets are known for many exemplars and are used to modify the weights of the network by use of gradient descent methods.

DCNs may be feed-forward networks. In addition, as described above, the connections from a neuron in a first layer of a DCN to a group of neurons in the next higher layer are shared across the neurons in the first layer. The feed-forward and shared connections of DCNs may be exploited for fast processing. The computational burden of a DCN may be much less, for example, than that of a similarly sized neural network that comprises recurrent or feedback connections.

The processing of each layer of a convolutional network may be considered a spatially invariant template or basis projection. If the input is first decomposed into multiple channels, such as the red, green, and blue channels of a color image, then the convolutional network trained on that input may be considered three-dimensional, with two spatial dimensions along the axes of the image and a third dimension capturing color information. The outputs of the convolutional connections may be considered to form a feature map in the subsequent layer, with each element of the feature map (e.g., 220) receiving input from a range of neurons in the previous layer (e.g., feature maps 218) and from each of the multiple channels. The values in the feature map may be further processed with a non-linearity, such as a rectification, max(0, x). Values from adjacent neurons may be further pooled, which corresponds to down sampling, and may provide additional local invariance and dimensionality reduction. Normalization, which corresponds to whitening, may also be applied through lateral inhibition between neurons in the feature map.

The performance of deep learning architectures may increase as more labeled data points become available or as computational power increases. Modern deep neural networks are routinely trained with computing resources that are thousands of times greater than what was available to a typical researcher just fifteen years ago. New architectures and training paradigms may further boost the performance of deep learning. Rectified linear units may reduce a training issue known as vanishing gradients. New training techniques may reduce over-fitting and thus enable larger models to achieve better generalization. Encapsulation techniques may abstract data in a given receptive field and further boost overall performance.

Figure 3:
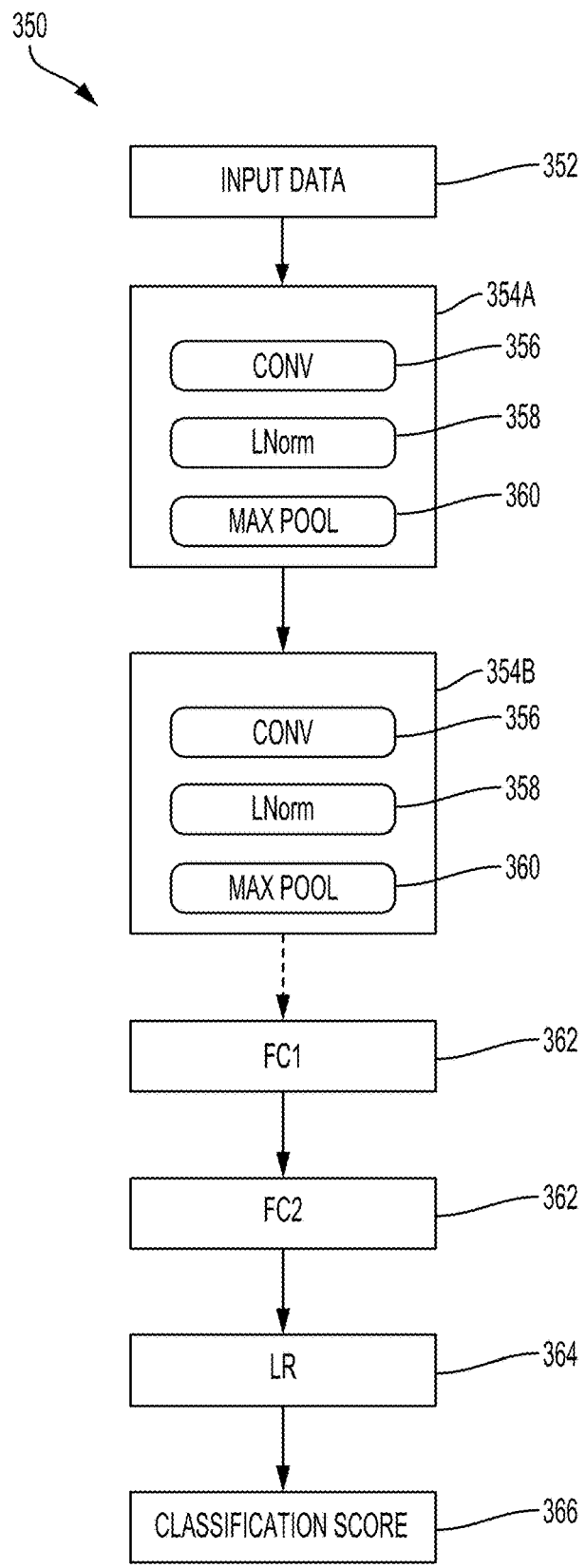
FIG. 3 is a block diagram illustrating an exemplary deep convolutional network (DCN) in accordance with aspects of the present disclosure.

FIG. 3 is a block diagram illustrating a deep convolutional network 350. The deep convolutional network 350 may include multiple different types of layers based on connectivity and weight sharing. As shown in FIG. 3, the deep convolutional network 350 includes the convolution blocks 354A, 354B. Each of the convolution blocks 354A, 354B may be configured with a convolution layer (CONV) 356, a normalization layer (LNorm) 358, and a max pooling layer (MAX POOL) 360.

The convolution layers 356 may include one or more convolutional filters, which may be applied to the input data to generate a feature map. Although only two of the convolution blocks 354A, 354B are shown, the present disclosure is not so limiting, and instead, any number of the convolution blocks 354A, 354B may be included in the deep convolutional network 350 according to design preference. The normalization layer 358 may normalize the output of the convolution filters. For example, the normalization layer 358 may provide whitening or lateral inhibition. The max pooling layer 360 may provide down sampling aggregation over space for local invariance and dimensionality reduction.

The parallel filter banks, for example, of a deep convolutional network may be loaded on a CPU 102 or GPU 104 of an SOC 100 to achieve high performance and low power consumption. In alternative embodiments, the parallel filter banks may be loaded on the DSP 106 or an ISP 116 of an SOC 100. In addition, the deep convolutional network 350 may access other processing blocks that may be present on the SOC 100, such as sensor processor 114 and navigation module 120, dedicated, respectively, to sensors and navigation.

The deep convolutional network 350 may also include one or more fully connected layers 362 (e.g., FC1 and FC2). The deep convolutional network 350 may further include a logistic regression (LR) layer 364. Between each layer 356, 358, 360, 362, 364 of the deep convolutional network 350 are weights (not shown) that are to be updated. The output of each of the layers (e.g., 356, 358, 360, 362, 364) may serve as an input of a succeeding one of the layers (e.g., 356, 358, 360, 362, 364) in the deep convolutional network 350 to learn hierarchical feature representations from input data 352 (e.g., images, audio, video, sensor data and/or other input data) supplied at the first of the convolution blocks 354A. The output of the deep convolutional network 350 is a classification score 366 for the input data 352. The classification score 366 may be a set of probabilities, where each probability is the probability of the input data including a feature from a set of features.

As discussed, aspects of the present disclosure are directed to a spherical regression system for n-spheres ($S^n$). The spherical regression system is a framework that may be applied to continuous estimation problems under radii constraints, such as viewpoint estimation, 3D rotation estimation, and surface normal estimation.

For simplicity, the spherical regression system is generally discussed in the context of viewpoint estimation. Still, the same framework can be applied to other regression tasks on $S^n$ spheres, such as surface normal estimations, orientation estimation, or quaternion regression, etc.

An n-sphere refers to a surface boundary of an (n+1)-dimensional sphere in a Euclidean space. For example, an $S^1$ sphere refers to a surface boundary of a two-dimensional (2D) sphere, and an $S^2$ sphere refers to a surface boundary of a three-dimensional (3D) sphere. The n-sphere may be defined as $S^n = \{x \in \mathbb{R}^{n+1} : \|x\| = r\}$, where $\mathbb{R}^{n+1}$ is the (n+1)-dimensional Euclidean space, r is a constant (e.g., a radius of a sphere), and x is an n+1 dimension vector. An $l_2$ norm constraint may reduce the complexity of the n-sphere topology in the Euclidean space, thereby reducing a computational complexity of a system for viewpoint estimation.

Rotational transformations are used in various computer vision tasks, such as, for example, orientation estimation, viewpoint/pose estimation, and camera relocation. Rotational transformations may be expressed as orthogonal matrices of a size n with a determinant of +1 (rotation matrices). The set of all possible rotation matrices may form a group that acts as an operator on vectors. This group may be referred to as a special orthogonal lie group SO(n). SO(1) represents the set of all one-dimensional (1D) rotation transformations (e.g., 1D rotation group), SO(2) represents the set of all two-dimensional (2D) rotation transformations (e.g., 2D rotation group), and SO(3) represents the set of all possible three-dimensional (3D) rotations (e.g., 3D rotation group).

A 2D rotation of an object by an angle $\varphi$ may be represented as $r = [\cos \varphi, \sin \varphi]$, where r is a 2D vector r that corresponds to a point on the $S^1$ sphere. Thus, in terms of topology, the $S^1$ sphere expresses the manifold of a 2D rotation group SO(2) because a 2D rotation from the 2D rotation group SO(2) corresponds to a vector point on the $S^1$ sphere. Therefore, the modeling of the 2D rotation group SO(2) may be converted to modeling an $S^1$ sphere.

Figure 4A:
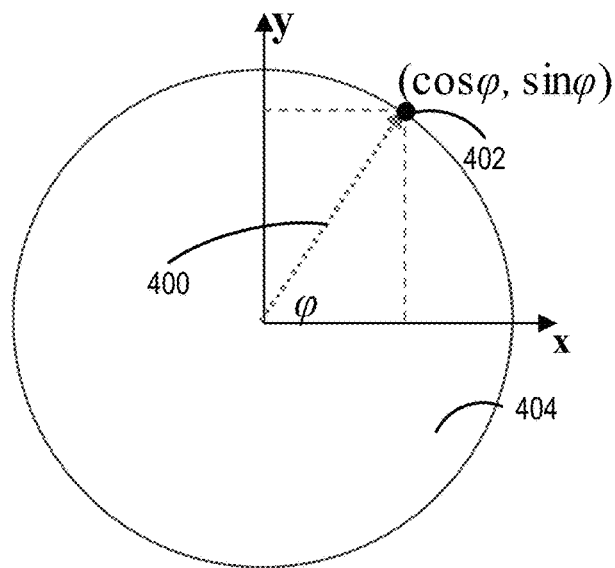
FIGS. 4A and 4B illustrate examples of two-dimensional (2D) rotation in accordance with aspects of the present disclosure.

FIG. 4A illustrates an example of a 2D vector r 400 corresponding to a point 402 on an $S^1$ sphere 404. In FIG. 4A, an angle $\varphi$ may be formed with the 2D vector r 400. The 2D representation of the point 402 (e.g., $(\cos \varphi, \sin \varphi)$) should lay on the $S^1$ sphere 404, such that $\cos^2\varphi + \sin^2\varphi = 1$.

Figure 4B:
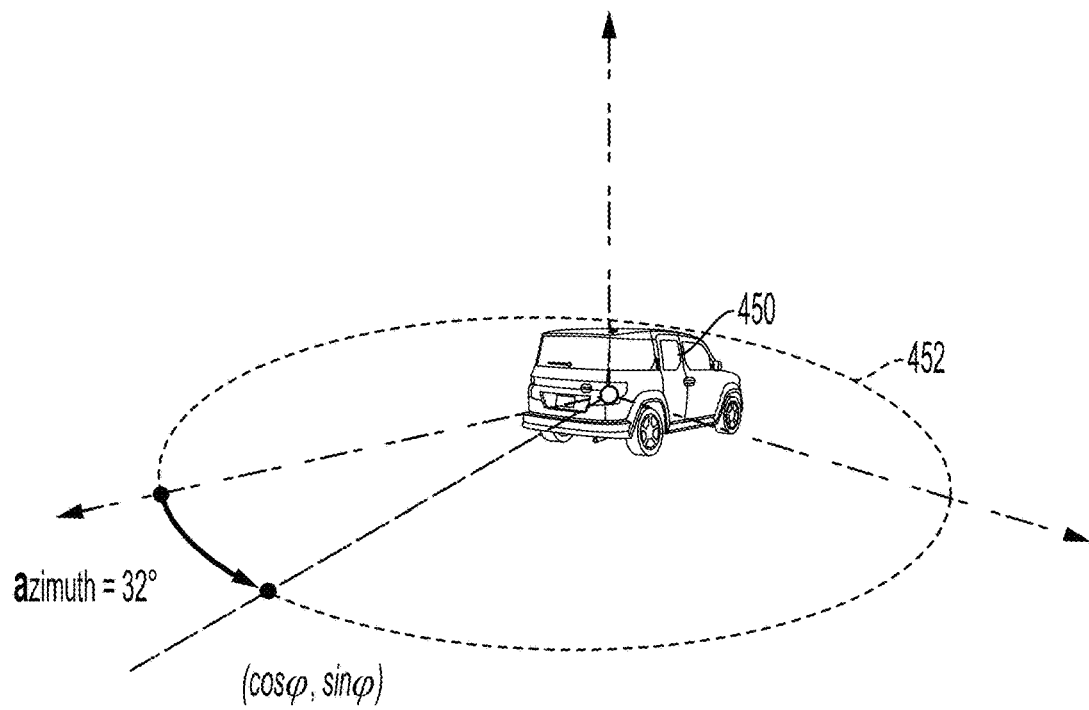

FIG. 4B illustrates an example of a 2D rotation of an object 450 by an angle $\varphi$ according to aspects of the present disclosure. As shown in FIG. 4B, an orientation of the object 450 with respect to a viewpoint may be estimated based on the azimuth provided by the coordinates (e.g., $(\cos \varphi, \sin \varphi)$) on the $S^1$ sphere 452. In the example of FIG. 4B, the car is oriented at a 32-degree angle, as indicated by the azimuth. The azimuth has a range of zero to $2\pi$.

A 3D rotation group SO(3) may be defined as a selection of a rotation axis and a rotation by an angle. The 3D rotation group SO(3) may not be identically mapped to a surface of an $S^3$ sphere (e.g., four-dimensional (4D) sphere). The 3D rotation may be represented by a unit quaternion, $q = a - bi + cj + dk$ that satisfies $a^2 + b^2 + c^2 + d^2 = 1$, where a, b, c, and d are real numbers, and i, j, and k are the fundamental quaternion units. Each 3D rotation is uniquely defined by a 3×3 rotation matrix, which is orthogonal and has a determinant equal to one. Each 3×3 rotation matrix may decompose into either a quaternion (a, b, c, d) or Euler angles (azimuth, elevation, theta).

Figure 5A:
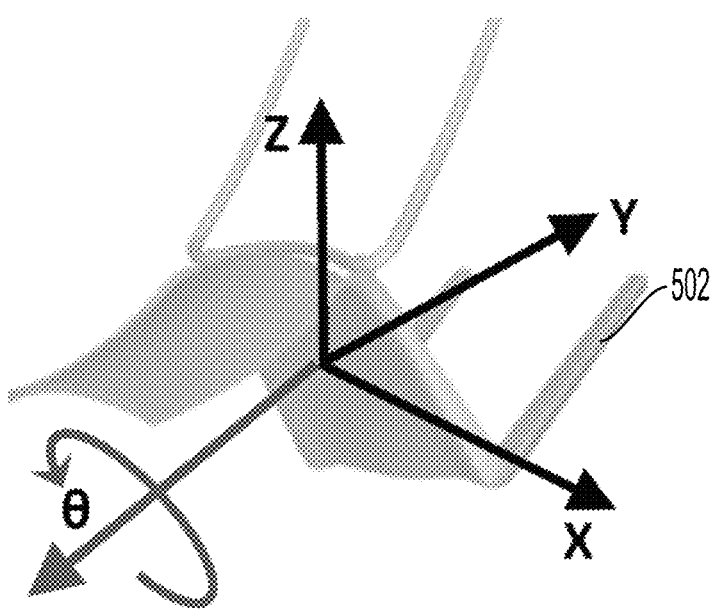
FIGS. 5A and 5B illustrate examples of viewpoint estimation in accordance with aspects of the present disclosure.
Figure 5B:
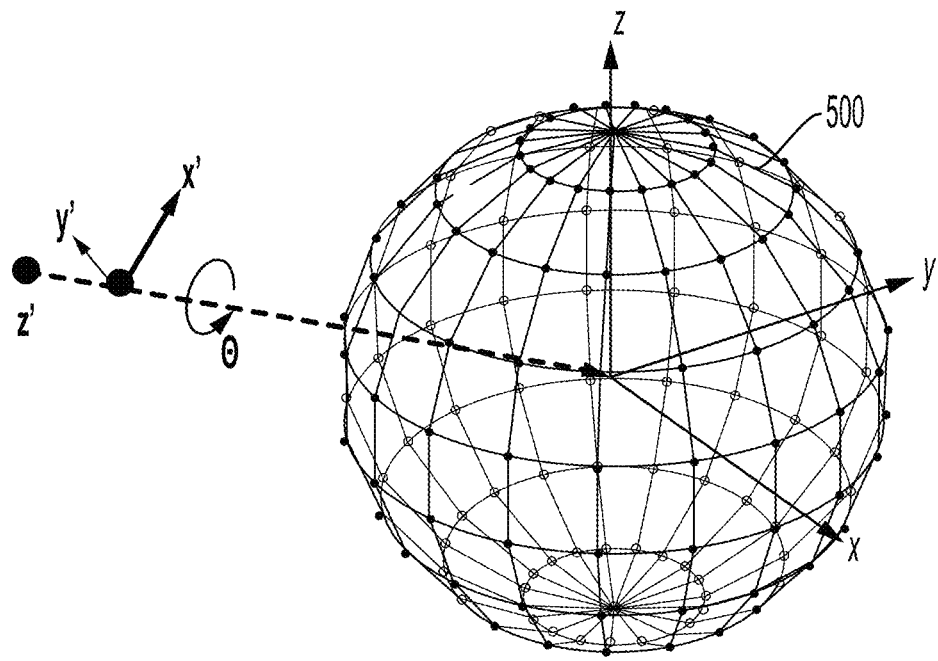

FIG. 5A illustrates an example of 3D rotation based on an $S^3$ sphere 500. As shown in FIG. 5A, the 3D rotation estimation based on the $S^3$ sphere 500 provides a rotation axis and rotate angle $\Theta$ with regard to an object 502. FIG. 5B illustrates an example of using a quaternion representation of 3D rotation based on the $S^3$ sphere 500. As shown in FIG. 5B, the quaternion coordinates are labeled based on coordinates of the $S^3$ sphere 500.

In one configuration, 3D unit vectors (x, y, z) represent surface normals in 3D shapes. Surface normals refer to the direction of motion in 3D flow fields or a geographical location on a sphere (e.g., Earth). The 3D unit vector has a fixed norm, $x^2 + y^2 - z^2 = 1$ and is located on a surface of the $S^2$ sphere. Still, any $S^n$ sphere may represent a unit vector space of an (n+1)-dimension direction.

Figure 6:
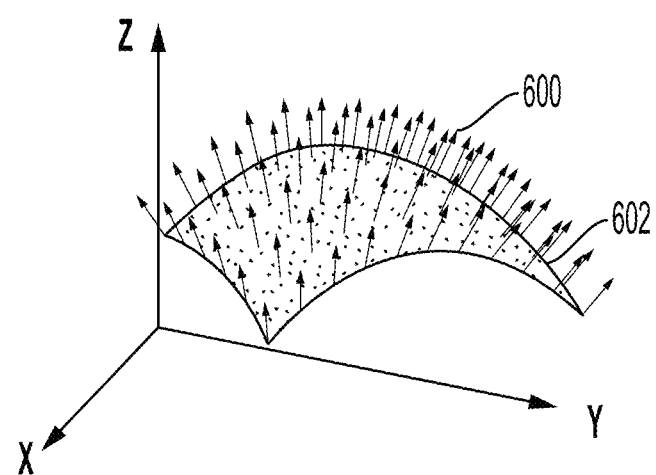
FIG. 6 illustrates an example of three-dimensional (3D) unit vectors in accordance with aspects of the present disclosure.

FIG. 6 illustrates an example of 3D unit vectors 600 according to aspects of the present disclosure. As shown in FIG. 6, 3D unit vectors 600 represent surface normals of a 3D shape 602. An $S^2$ sphere may be used for surface normal estimation (e.g., regression). The 3D unit vectors 600 are perpendicular to a surface of the 3D shape 602.

The $S^n$ spheres and the rotation groups SO(n) may be used for modeling rotational transformations for viewpoint/pose estimation or a quaternion. As another example, the $S^n$ spheres and the rotation groups SO(n) may model 2D rotation (orientation estimation) or 3D rotation. Orientation estimation is independent of surface normal estimation.

Viewpoint estimation from 2D images determines the relative 3D rotation of an object with respect to the camera.

The 3D rotation is expressed by a matrix R. The matrix R may be selected from a set of all possible 3D rotations. For simplicity, the 3D rotation is obtained by independently predicting three Euler angles (e.g., azimuth (a), elevation (e), and in-plane rotation (t)). In one configuration, regression on the S" sphere is performed to train a neural network to label an input with coordinates on the S" sphere associated with the spherical targets. The spherical targets may be represented by (n+1)-dimension vectors P=[$p_0$, . . . , $p_n$] that lie on the S" sphere (e.g., $\Sigma_{i=0, \ldots, n} p_i^2 = 1$).

That is, aspects of the present disclosure estimate n-sphere targets given an input, such as an image of an object. Still, the input is not limited to an image. The n-sphere may represent 2D/3D rotations. Therefore, aspects of the present disclosure may be used in viewpoint estimation, surface normal estimation, rotation estimation, and/or other estimations where the problem can be formulated as regression of an n-sphere target.

The estimation (e.g., viewpoint estimation, surface normal estimation, rotation estimation) may be referred to as a spherical target. The neural network may associate an input with a set of values corresponding to the spherical target based on a representation of an object in an input. As is known to those of skill in the art, in artificial neural networks, associating a value to an input may be referred to as labeling.

As an example, when the spherical target is a viewpoint estimation, the neural network predicts the viewpoint angle of the object in relation to a sensor that captured the input. In this example, the input may be associated with (e.g., labeled) numerical values (e.g. coordinates) of the viewpoint angle for the viewpoint estimation. As another example, when the spherical target is a surface normal estimation, the neural network may predict surface normals of the object. In this example, the input may be associated with numerical values corresponding to the surface normals for the surface normal estimation. In yet another example, when the spherical target is a rotation estimation, the neural network may predict a quaternion of a 3D rotation of the object. In this example, the input may be associated with numerical values corresponding to the quaternion for the rotation estimation.

In one configuration, given an image x of an object, viewpoint estimation recovers the orientation angle(s) φ of the object with respect to the camera. In one configuration, a neural network, such as a convolutional neural network (CNN), is trained to generate a d-dimension vector representation for a prediction P of the orientation angles. That is, the CNN may output a prediction P=[cos φ, sin φ] for 2D rotations, where the prediction P is a bounded vector.

The neural network may be trained end-to-end. For simplicity, the neural network may be described as two subnetworks. A first subnetwork (e.g., base neural network) H(•) maps the pixel values of an input image x into a raw d-dimension vector representation O=[$o_0, o_1, \ldots o_d$]$^T$, where d={1, 2, 3} depends on a type of estimation and T represents the transpose of the vector. The base neural network may be implemented by a stack of convolutional layers with non-linearities and fully connected layers, namely H= $h_n \circ h_{n-1} \ldots \circ h_2 \circ h_1$, where $h_k$ is the function for the k-th neural network layer.

A second subnetwork (e.g., prediction head) is defined after the base network. The second subnetwork provides the prediction P. During training, a loss function L(•, •) may be defined after the second subnetwork. The loss function may be used during training to compute the distance between the prediction P and a ground truth representation. In one configuration, the second subnetwork implements a spherical exponential activation function.

As discussed, the values for P are based on a type of estimation. For example, for 1D orientation estimation, P is (cos φ, sin φ). In yet another example, for surface normal estimation, P is (x, y, z).

During training, the k-th layer parameters may be updated with stochastic gradient descent, $$\theta_k \leftarrow \theta_k - \gamma \frac{\partial \mathcal{L}}{\partial \theta_k},$$

where γ is the learning rate and $\theta_k$ denotes the learnable parameters of the k-th layer. Expanding by the chain rule of calculus provides:

$$\frac{\partial \mathcal{L}}{\partial \theta_k} = \frac{\partial \mathcal{L}}{\partial h_k}\frac{\partial h_k}{\partial \theta_k} = \frac{\partial \mathcal{L}}{\partial O}\left(\frac{\partial O}{\partial h_{n-1}} \ldots \frac{\partial h_{m+1}}{\partial h_k}\right)\frac{\partial h_k}{\partial \theta_k}. \quad (1)$$

When gradients are constrained, training may be stabilized, and the consistency of convergence may be improved. Constrained gradients improve stability when training regression neural networks on S" spheres. A spherical exponential activation function may be used to constrain the gradient $$\frac{\partial \mathcal{L}}{\partial O}.$$

The spherical exponential activation function may be inserted into the regression after the output O.

The output of the spherical exponential activation function (e.g., prediction P={$p_k$}) is constrained, such that an $l_2$ norm is constant, namely $\Sigma_{k=1} p_k^2 = 1$ (e.g., $\cos^2\varphi + \sin^2\varphi = 1$). The prediction is constrained because the output refers to circular/spherical target labels. Additionally, in one configuration, the gradient $$\frac{\partial L}{\partial O}$$

does not directly depend on an input image x. That is, the gradient $$\frac{\partial L}{\partial O}$$

does not depend, directly, on the vector representation O. This may improve stability during training, such as training on a large dataset.

The spherical exponential activation function generates normalized values to constrain the output (e.g., prediction P). That is, the spherical exponential activation function is an $\ell_2$ normalization activation function, where $$p_j = g(o_j; O) = \frac{f(o_j)}{\sqrt{\sum_k f(o_k)^2}}$$

and $f(\ )$ corresponds to a univariate mapping. The partial derivative of the probability output with respect to the latent activations $$\frac{\partial p_i}{\partial o_j}$$

is derived by:

$$\frac{\partial p_j}{\partial o_i} = \frac{\partial \left[\frac{f(o_i)}{\sqrt{\sum_k f(o_k)^2}}\right]}{\partial o_i} \qquad (2)$$

$$= \begin{cases} \frac{\partial f(o_i)}{\partial o_i} \cdot \frac{1}{A} \cdot [1 - p_i^2], & \text{when } j = i \\ \frac{\partial f(o_j)}{\partial o_j} \cdot \frac{1}{A} (-p_j \cdot p_i), & \text{when } j \neq i \end{cases},$$

where $A = \sqrt{\sum_k f(o_k)^2}$ is the normalization factor. To make the latent activations $$\frac{\partial p_i}{\partial o_j}$$

independent from the raw output O, $$\frac{\partial f(o_i)}{\partial o_i} \cdot \frac{1}{A}$$

made independent from the raw output O, where $$\frac{\partial f(o_i)}{\partial o_i}$$

is a derivative of the output of the univariate function $f(\ )$ with respect to the input. In one configuration, an exponential map $f(o_i) = e^{o_i}$ is used:

$$p_i = \frac{e^{o_i}}{\sqrt{\sum_k (e^{o_k})^2}}. \qquad (3)$$

The spherical exponential activation function maps inputs in $R^{(n+1)}$ to the positive domain of the n-sphere, where $R^{(n+1)}$ is the n+1-dimensional Euclidean space. Accordingly, $$\frac{\partial f(o_i)}{\partial o_i} = f(o_i),$$

as such, $$\frac{\partial f(o_i)}{\partial o_i} \cdot \frac{1}{A} = \frac{f(o_i)}{A} = p_i.$$

Thus, the dependency of the gradient of the activation function is not dependent on the raw output O:

$$\frac{\partial p_j}{\partial o_i} \begin{cases} p_i \cdot [1 - p_i^2], & \text{when } j = i \\ -p_i \cdot p_j^2, & \text{when } j \neq i \end{cases}. \qquad (4)$$

The exponential map may bound the output values to a positive range. Still, in spherical regression, the targets may be either positive or negative. To provide viewpoint regression on positive and negative angles, the 2D representation may be reparametrized as:

$$\begin{cases} \cos\phi = \text{sign}(\cos\phi) \cdot |\cos\phi| \\ \sin\phi = \text{sign}(\sin\phi) \cdot |\sin\phi| \end{cases}, \qquad (5)$$

where the signs and the absolute values of the regression targets are separately predicted.

Figure 7:
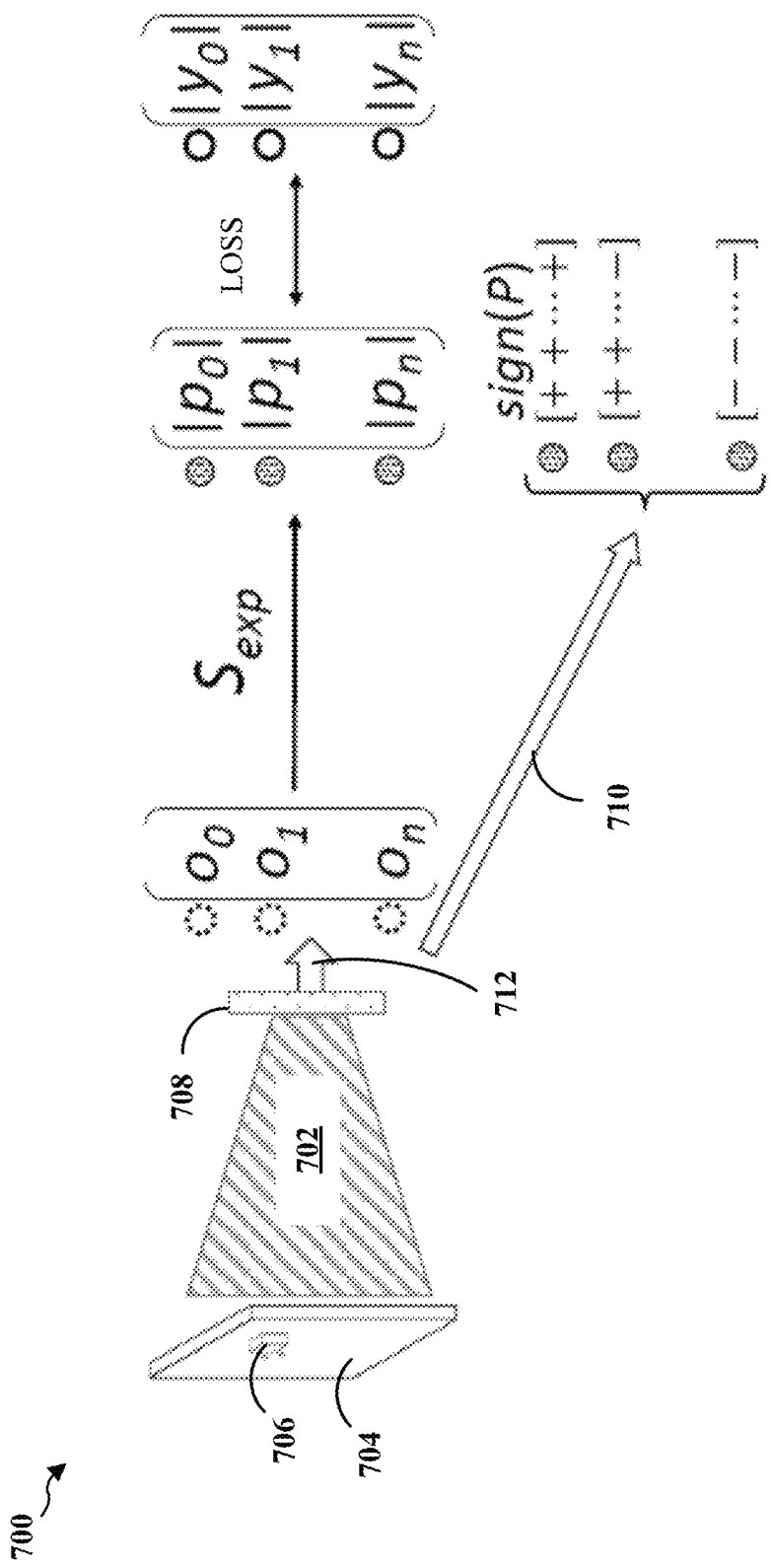
FIG. 7 illustrates an example of a spherical regression system according to aspects of the present disclosure.

FIG. 7 illustrates an example of a spherical regression system 700 according to aspects of the present disclosure. As an example, the spherical regression system 700 may label a spherical target for a 2D rotation group SO(2), where the output representation lies on $S^1$. In this example, the raw output O is a vector with two values $[o_1$ and $o_2]$ and the activation output P is a vector with two values $[p_1$ and $p_2]$. Aspects of the present disclosure are not limited to labeling a spherical target for a 2D rotation group SO(2), as other rotation groups are contemplated. As shown in FIG. 7, the raw output O may be a vector of values $o_0$ to $o_n$.

As shown in FIG. 7, an image 704 is input to a first neural network 702. The first neural network 702 may be a convolutional neural network. The image 704 may be obtained via a sensor, such as a camera, of a device, such as an autonomous vehicle. A kernel 706, having dimensions that are less than the dimensions of the image 704, may be applied to obtain features from the image 704.

In conventional classification systems, activations generated by an activation layer 708 of the first neural network 702 are distributed over multiple bins by a softmax layer. In contrast to classification systems, a regression system may output a continuous prediction (e.g., non-discretized prediction). Regardless of a type of loss function (e.g., L1, L2, smooth-L1), the regression system learns absolute values (e.g., cos φ, sin φ) of a target.

In FIG. 7, the output ($o_1$ and $o_2$) of the first neural network 702 may be unconstrained. As such, outputs $o_1$ and $o_2$ may not satisfy a unit $l_2$ norm. That is, $o_1^2 + o_2^2 \neq 1$, where $o_1$ and $o_2$ are independent of each other. In conventional regression systems, the gradient depends on an unconstrained raw output $o_i$. Therefore, conventional regression systems may result in inaccurate training, thereby resulting in inaccurate predictions.

Aspects of the present disclosure are directed to applying a spherical exponential activation function ($S_{exp}$) on the output ($o_1$ and $o_2$) of the first neural network 702 to generate a constrained output ($p_1$ and $p_2$). As shown in FIG. 7, the constrained output may be a vector from $p_0$ to $p_n$. The constrained output ($p_i$) may also be referred to as a probability output. The $l_2$ norm of the constrained output is equal to one. As discussed, the output of the first neural network 702 is not limited to two outputs. Additional (e.g., $o_1$, $o_2$, . . . , $o_n$) or fewer outputs (e.g., $o_1$) may be generated based on the task. Furthermore, the number of constrained outputs may correspond to the number of outputs of the first neural network 702.

Accordingly, the gradients are now constrained by design. Specifically, the gradient $$\frac{\partial P}{\partial O}$$

is independent of the output ($o_i$) and the constrained output ($p_i$) is bounded by the n-sphere. Therefore, aspects of the present disclosure mitigate the need for gradient clipping and/or gradient normalization. Additionally, aspects of the present disclosure are not sensitive to an input (e.g., image 704).

As shown in FIG. 7, a second branch 710 determines the signs of the output. In the present example of labeling a spherical target for a 2D rotation group SO(2), the second branch 710 determines the signs for the coordinates on a 2D sphere (e.g., cos φ, sin φ). The signs may be determined according to equation 5. In the example of FIG. 7, a first branch 712 determines the absolute values of cos φ and sin φ and the second branch 710 determines the signs of cos φ and sin φ. At test time (e.g., real-world deployment), the signs and absolute values are combined for the final prediction.

During training, the constrained output ($p_i$) is compared against an absolute value. In the example of a 2D sphere, the loss function compares the constrained output ($|p_1|$ and $|p_2|$) against absolute ground truth values $|\cos \varphi|$ and $|\sin \varphi|$. As shown in FIG. 7, the absolute ground truth values are a vector of absolute values $|y_0|$ to $|y_n|$. The loss function may be the cosine similarity function:

$$\frac{\partial}{\partial p_i} cossim(P, Y) = \frac{y_i}{|P| \cdot |Y|} - cossim(P, Y) \cdot \frac{p_i}{|P|^2}. \quad (6)$$

In another configuration, cross-entropy loss is used to determine the loss:

$$H(Y, P) = \sum_i y_i \log \frac{1}{p_i} \quad (7)$$

The discussion for FIG. 7 was limited to spherical regression for the 2D rotation group SO(2), where the output representation lies on $S^1$. Aspects of the present disclosure may be extended to any $S^n$ sphere. In one configuration, the direction in an n-dimensional space is represented by a vector v'[$x_1, x_2, \ldots, x_n$]. The vector v may be normalized to unit length (e.g., $\Sigma x_i^2 = 1$), implying that the target for the model lies on the $S^{n-1}$ sphere. Thus, the spherical regression may be used for $S^{n-1}$ spheres.

Additionally, spherical regression may be used for determining a directional vector on any dimension. As discussed, aspects of the present disclosure may be used for surface normal estimation. A surface normal is a direction that is perpendicular to the tangent plane of a point on a surface object in a scene, such as a 3D scene. The surface normal may be represented by a unit 3D vector v=[x, y, z] that lies on the $S^2$ sphere. The unit 3D vector v satisfies $x^2+y^2+z^2=1$.

For surface normal estimation, pixel-wise prediction may be implemented for an image of a scene. Similar to an $S^1$ target (cos φ, sin φ), an absolute value and a sign for the values of the unit 3D vector v are separately determined. For surfaces in an image, the normal direction points outwards from the image plane (e.g., z<0). Therefore, the prediction space is reduced, where the signs of x and y are predicted. During training, the cross-entropy loss is used for a sign classification branch. For a regression branch, the cosine proximity to the ground truth of the absolute normal $\langle \hat{v}|, |v \rangle$ is used, where v is the ground truth and $\hat{v}$ is the prediction. At test time, the signs and absolute values are combined for the final prediction.

Aspects of the present disclosure may also be used for quaternion parameterization of a 3D rotation group SO(3). A unit quaternion q representation of the 3D rotation group SO(3) is represented as q=a+bi+cj+dk, where $a^2+b^2+c^2+d^2=1$ (e.g., lies on the $S^3$ sphere). The values q and −q provide a same rotation. Therefore, a is greater than zero, such that an output space is reduced. In this configuration, signs are predicted for components {b, c, d}. The design of prediction branches and loss functions are similar to the case of surface normal prediction on an $S^2$ sphere (see FIG. 6). Given the axis-angle representation (θ, v) of the 3D rotation group SO(3), the quaternion q may be defined as $$\left(\cos\frac{\theta}{2}, \sin\frac{\theta}{2}v\right).$$

The constraint of a being greater than zero may be similar to restricting a rotation angle θ ∈ [0, π]. Predicting the eight sign categories may be similar to predicting to the quadrant of the 3D rotation axis where v is located. For a quaternion (a, b, c, d), it is assumed that a is positive. Therefore, b, c, and d may be positive or negative. As such, eight sign categories may be predicted for the quaternion.

Figure 8:
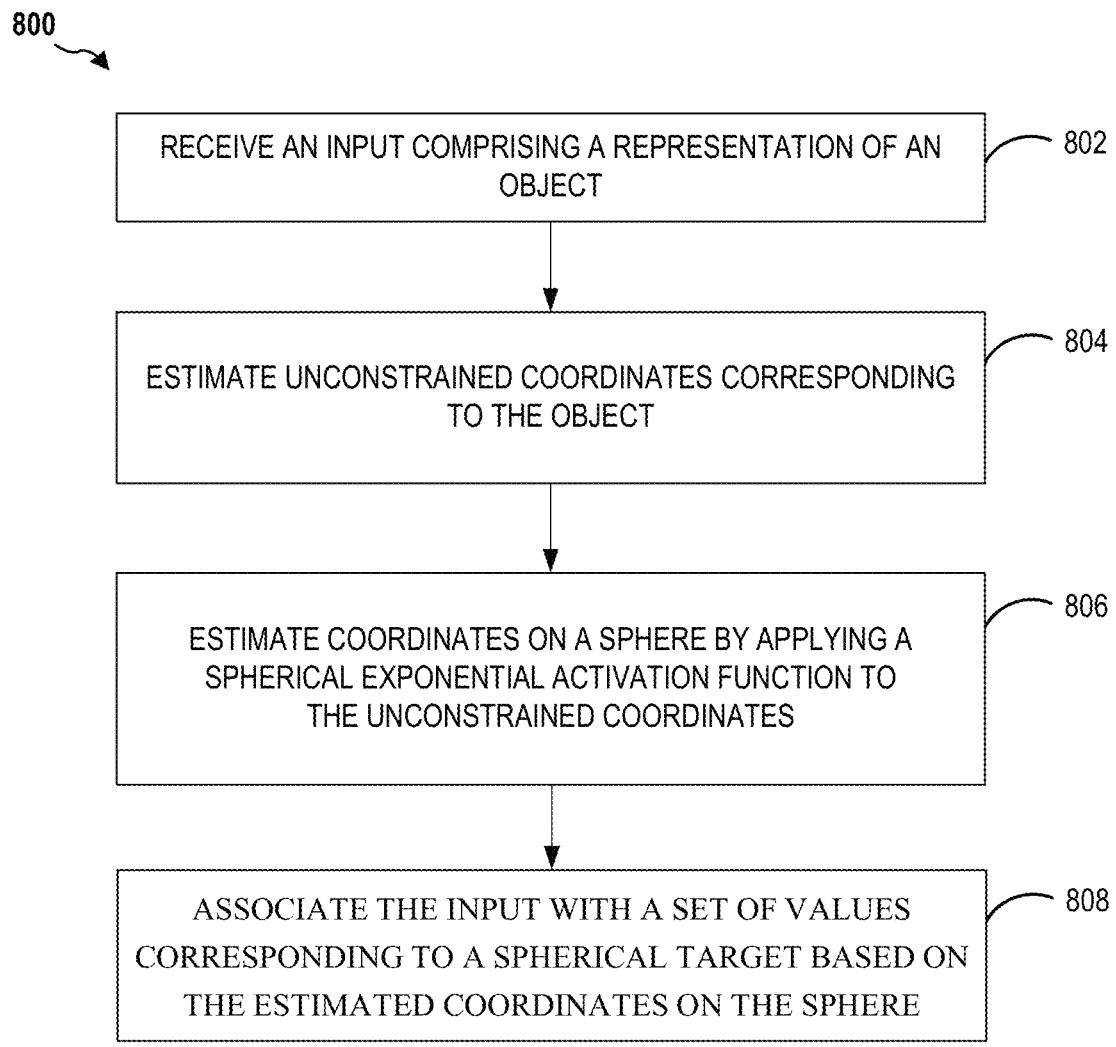
FIG. 8 illustrates a method in accordance with aspects of the present disclosure.

FIG. 8 illustrates a flow diagram 800 according to aspects of the present disclosure. The method may estimate a spherical target via a spherical regression-based neural network according to an aspect of the present disclosure. The spherical target may be a surface normal, viewpoint, quaternion, or other type of spherical target. As shown in FIG. 8, at block 802 the neural network receives an input comprising a representation of an object. For example, the input is a 2D image of a 3D object. The input is not limited to an image as other types of inputs may be received. The spherical regression system 700 of FIG. 7 is an example of a spherical regression-based neural network.

At block 804, the neural network estimates unconstrained coordinates corresponding to the object. The unconstrained coordinate estimation may be generated at a penultimate layer of the neural network. The unconstrained coordinate estimation may be a vector of continuous predictions (e.g., estimations). The number of elements of the vector may be based on a type of estimation (e.g., 1D, 2D, or 3D estimation).

At block 806, the neural network estimates coordinates on a sphere by applying a spherical exponential activation function to the unconstrained coordinates. That is, the neural network may constrain the estimated coordinates to a sphere. During training, the spherical exponential activation function may be trained using a loss function, such as a cosine distance function. The dimensions of the sphere may be on the spherical target. For example, for surface normal estimation, the sphere may be a 3D sphere. As another example, for viewpoint estimation the sphere may be 2D or 3D.

At block 808, the neural network labeling the input with a set of values corresponding to a spherical target based on the estimated coordinates on the sphere. The set of values may include a viewpoint angle of the object in relation to a sensor that captured the input, the quaternion representation of a 3D rotation of the object, or the surface normal of the object. As an example, the neural network associated the input with (e.g., label) a viewpoint angle of the object in relation to a sensor that captured the input, label the quaternion representation of a 3D rotation of the object, or label the surface normal of the object. In one configuration, the viewpoint angle includes three Euler angles. The coordinates on the sphere satisfy an $l_2$ norm of a sphere equal to one.

In one configuration, the neural network also generates signs for the spherical target. The signs may be combined with the predicted labels at the output of the neural network. During training, the signs are trained via a separate branch of the neural network.

In some aspects, the method 800 may be performed by the SOC 100 (FIG. 1). That is, each of the elements of the method 800 may, for example, but without limitation, be performed by the SOC 100 or one or more processors (e.g., CPU 102) and/or other included components.

The various operations of methods described above may be performed by any suitable means capable of performing the corresponding functions. The means may include various hardware and/or software component(s) and/or module(s), including, but not limited to, a circuit, an application specific integrated circuit (ASIC), or processor. Generally, where there are operations illustrated in the figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database or another data structure), ascertaining and the like. Additionally, "determining" may include receiving (e.g., receiving information), accessing (e.g., accessing data in a memory) and the like. Furthermore, "determining" may include resolving, selecting, choosing, establishing, and the like.

As used herein, a phrase referring to "at least one of a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a general-purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, erasable programmable read-only memory (EPROM), electrically erasable programmable read-only memory (EEPROM), registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, random access memory (RAM), flash memory, read only memory (ROM), programmable read-only memory (PROM), erasable programmable read-only memory (EPROM), electrically erasable programmable Read-only memory (EEPROM), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system.

By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or general register files. Although the various components discussed may be described as having a specific location, such as a local component, they may also be configured in various ways, such as certain components being configured as part of a distributed computing system.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may comprise one or more neuromorphic processors for implementing the neuron models and models of neural systems described herein. As another alternative, the processing system may be implemented with an application specific integrated circuit (ASIC) with the processor, the bus interface, the user interface, supporting circuitry, and at least a portion of the machine-readable media integrated into a single chip, or with one or more field programmable gate arrays (FPGAs), programmable logic devices (PLDs), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Additionally, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer- readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

What is claimed is:

1. A method, comprising:
receiving an input comprising a representation of an object;
estimating unconstrained coordinates corresponding to the object;
estimating coordinates on a sphere by applying a spherical exponential activation function to the unconstrained coordinates; and
associating the input with a set of values corresponding to a spherical target based on the estimated coordinates on the sphere.

2. The method of claim 1, the set of values comprise:
a viewpoint angle of the object in relation to a sensor that captured the input;
a quaternion representation of a three-dimensional rotation of the object; or
surface normals of the object.

3. The method of claim 2, in which the viewpoint angle comprises three Euler angles.

4. The method of claim 1, in which the coordinates on the sphere satisfy an $l_2$ norm equal to one.

5. The method of claim 1, further comprising generating signs for the spherical target.

6. An apparatus, comprising:
a memory; and
at least one processor coupled to the memory, the at least one processor configured:
to receive an input comprising a representation of an object;
to estimate unconstrained coordinates corresponding to the object;
to estimate coordinates on a sphere by applying a spherical exponential activation function to the unconstrained coordinates; and
to associate the input with a set of values corresponding to a spherical target based on the estimated coordinates on the sphere.

7. The apparatus of claim 6, in which the set of values comprise:
a viewpoint angle of the object in relation to a sensor that captured the input;
a quaternion representation of a three-dimensional rotation of the object; or
surface normals of the object.

8. The apparatus of claim 7, in which the viewpoint angle comprises three Euler angles.

9. The apparatus of claim 6, in which the coordinates on the sphere satisfy an $l_2$ norm equal to one.

10. The apparatus of claim 6, in which the at least one processor is configured to generate signs for the spherical target.

11. A non-transitory computer-readable medium having program code recorded thereon, the program code executed by a processor and causes the processor to:
receive an input comprising a representation of an object;
estimate unconstrained coordinates corresponding to the object;
estimate coordinates on a sphere by applying a spherical exponential activation function to the unconstrained coordinates; and
associate the input with a set of values corresponding to a spherical target based on the estimated coordinates on the sphere.

12. The non-transitory computer-readable medium of claim 11, in which the set of values comprise:
a viewpoint angle of the object in relation to a sensor that captured the input;
a quaternion representation of a three-dimensional rotation of the object; or
surface normals of the object.

13. The non-transitory computer-readable medium of claim 12, in which the viewpoint angle comprises three Euler angles.

14. The non-transitory computer-readable medium of claim 11, in which the coordinates on the sphere satisfy an $l_2$ norm equal to one.

15. The non-transitory computer-readable medium of claim 11, in which the program code further comprises program code to generate signs for the spherical target.

16. An apparatus, comprising:
means for receiving an input comprising a representation of an object;
means for estimating unconstrained coordinates corresponding to the object;
means for estimating coordinates on a sphere by applying a spherical exponential activation function to the unconstrained coordinates; and
means for associating the input with a set of values corresponding to a spherical target based on the estimated coordinates on the sphere.

17. The apparatus of claim 16, in which the set of values comprise:
a viewpoint angle of the object in relation to a sensor that captured the input;
a quaternion representation of a three-dimensional rotation of the object; or
surface normals of the object.

18. The apparatus of claim 17, in which the viewpoint angle comprises three Euler angles.

19. The apparatus of claim 16, in which the coordinates on the sphere satisfy an $l_2$ norm equal to one.

20. The apparatus of claim 16, further comprising means for generating signs for the spherical target.

* * * * *